United States Patent
Sugimoto et al.

(10) Patent No.: US 10,145,598 B2
(45) Date of Patent: Dec. 4, 2018

(54) REFRIGERATION APPARATUS

(71) Applicants: Mitsubishi Electric Corporation, Tokyo (JP); Asahi Glass Company, Limited, Tokyo (JP)

(72) Inventors: Takeshi Sugimoto, Tokyo (JP); Tetsuji Saikusa, Tokyo (JP)

(73) Assignees: Mitsubishi Electric Corporation, Tokyo (JP); Asahi Glass Company, Limited, Tokyo (JP)

(*) Notice: Subject to any disclaimer, the term of this patent is extended or adjusted under 35 U.S.C. 154(b) by 0 days.

(21) Appl. No.: 15/109,241

(22) PCT Filed: Mar. 14, 2014

(86) PCT No.: PCT/JP2014/056989
§ 371 (c)(1),
(2) Date: Jun. 30, 2016

(87) PCT Pub. No.: WO2015/136706
PCT Pub. Date: Sep. 17, 2015

(65) Prior Publication Data
US 2016/0327321 A1    Nov. 10, 2016

(51) Int. Cl.
*F25B 41/06* (2006.01)
*F25B 49/02* (2006.01)
(Continued)

(52) U.S. Cl.
CPC ............... *F25B 49/02* (2013.01); *F25B 1/00* (2013.01); *F25B 41/04* (2013.01); *F25B 41/06* (2013.01);
(Continued)

(58) Field of Classification Search
CPC ...... F25B 49/02; F25B 41/062; F25B 49/022; F25B 41/06; F25B 1/00; F25B 2500/06;
(Continued)

(56) References Cited

U.S. PATENT DOCUMENTS 4,253,310 A * 3/1981 Sokolov ............... B60H 1/3201
62/101
4,840,042 A * 6/1989 Ikoma ..................... F25B 9/006
62/114

(Continued)

FOREIGN PATENT DOCUMENTS

CN    103562338 A    2/2014
EP    0521551 A1 *    1/1993 ............ F25B 49/022
(Continued)

OTHER PUBLICATIONS

Office Action dated Apr. 27, 2017 issued in corresponding CN patent application No. 201480072830.3 (and English translation).
(Continued)

*Primary Examiner* — Frantz Jules
*Assistant Examiner* — Nelson Nieves
(74) *Attorney, Agent, or Firm* — Posz Law Group, PLC

(57) ABSTRACT

A refrigeration apparatus includes a refrigerant circuit in which a compressor, a condenser, a liquid receiver, a first opening-and-closing valve, an expansion valve, and an evaporator are connected sequentially by pipes and through which refrigerant circulates. The refrigerant is HFO1123 or a refrigerant mixture containing HFO1123. A ratio of a refrigeration capacity to an opening area of the first opening-and-closing valve is within a range of 0.25 to 0.6 (kW/mm$^2$).

4 Claims, 3 Drawing Sheets

(51) Int. Cl.
*F25B 1/00* (2006.01)
*F25B 41/04* (2006.01)

(52) U.S. Cl.
CPC .......... *F25B 41/062* (2013.01); *F25B 49/022* (2013.01); *F25B 2400/01* (2013.01); *F25B 2400/04* (2013.01); *F25B 2400/16* (2013.01); *F25B 2500/06* (2013.01); *F25B 2500/07* (2013.01); *F25B 2500/26* (2013.01); *F25B 2500/27* (2013.01); *F25B 2600/021* (2013.01); *F25B 2600/2501* (2013.01); *F25B 2600/2515* (2013.01); *F25B 2700/1933* (2013.01); *F25B 2700/2104* (2013.01); *Y02B 30/741* (2013.01)

(58) Field of Classification Search
CPC .......... F25B 2600/2515; F25B 2500/27; F25B 2500/07; F25B 2400/01; F25B 2600/021; F25B 2700/1933; Y02B 30/741
See application file for complete search history.

(56) References Cited

U.S. PATENT DOCUMENTS

| | | | | |
|---|---|---|---|---|
| 2002/0139137 | A1* | 10/2002 | Tipton | F04C 18/0215 62/498 |
| 2010/0090156 | A1* | 4/2010 | Nappa | C09K 5/045 252/74 |
| 2012/0167605 | A1* | 7/2012 | Ikemiya | B60H 1/3232 62/126 |
| 2013/0111929 | A1* | 5/2013 | Jekimow | F25B 41/062 62/56 |
| 2013/0213083 | A1* | 8/2013 | Higashiiue | F25B 5/04 62/500 |
| 2014/0070132 | A1* | 3/2014 | Fukushima | F25B 9/002 252/67 |
| 2014/0077122 | A1* | 3/2014 | Fukushima | C09K 5/044 252/67 |
| 2014/0137580 | A1* | 5/2014 | Peyaud | F25B 41/04 62/80 |
| 2015/0153076 | A1* | 6/2015 | Sugimoto | F25B 7/00 62/175 |
| 2015/0239322 | A1* | 8/2015 | Yokoo | F25B 5/04 62/158 |
| 2016/0231040 | A1* | 8/2016 | Hellmann | F25B 43/00 |

FOREIGN PATENT DOCUMENTS

| | | |
|---|---|---|
| JP | H04-268164 A | 9/1992 |
| JP | H05-164413 A | 6/1993 |
| JP | H09-159296 A | 6/1997 |
| JP | 11-193976 A | 7/1999 |
| JP | 2002-286334 A | 10/2002 |
| JP | 2012-093054 A | 5/2012 |
| JP | 2012-189246 A | 10/2012 |
| WO | 2012/157764 A1 | 11/2012 |
| WO | 2014/030236 A1 | 2/2014 |

OTHER PUBLICATIONS

International Search Report of the International Searching Authority dated Jun. 10, 2014 for the corresponding International application No. PCT/JP2014/056989 (and English translation).

Extended EP Search Report dated Oct. 5, 2017 issued in corresponding EP patent application No. 14885251.0.

Office Action dated Nov. 1, 2017 issued in corresponding CN patent application No. 201480072830.3 (and English translation).

* cited by examiner

REFRIGERATION APPARATUS

CROSS REFERENCE TO RELATED APPLICATION

This application is a U.S. national stage application of International Application No. PCT/JP2014/056989 filed on Mar. 14, 2014, the disclosure of which is incorporated herein by reference.

TECHNICAL FIELD

The present invention relates to a refrigeration apparatus that suppresses the influence on global warming.

BACKGROUND ART

There has conventionally been a refrigeration apparatus constituted by a refrigerant circuit in which a compressor, a condenser, a liquid receiver, an expansion valve, and an evaporator are connected in order by pipes (see, for example, Patent Literature 1).

In some refrigeration apparatuses of this type, a solenoid valve is provided between the liquid receiver and the expansion valve, a pressure sensor is provided on a suction side of the compressor, and a temperature sensor is provided in a cooling target space near the evaporator. When the temperature in the cooling target space detected by the temperature sensor becomes lower than a predetermined value, the solenoid valve closes and refrigerant is collected in the liquid receiver (pump-down). When the pressure detected by the pressure sensor becomes lower than a predetermined value, the compressor stops. When the temperature in the cooling target space detected by the temperature sensor and the pressure detected by the pressure sensor become higher than the predetermined values, the solenoid valve opens and the compressor is operated.

As refrigerant for circulating through the refrigerant circuit of the refrigeration apparatus of this type, a low-GWP (global warming potential) refrigerant has recently been developed to suppress the influence on global warming. Although an HFC (hydrofluorocarbon)-based refrigerant (for example, R410A, R404A, R407C, R134a) used conventionally has high performance, the GWP thereof is high (for example, the GWP of A410A is about 2000). Accordingly, a fluoropropene-based (HFO-based) refrigerant, such as R1234yf, has been developed to further lower the GWP. However, since this refrigerant has a high boiling point and low performance, there are many technical problems in efforts to maintain performance equal to that of the conventional refrigerant, leading to an increased cost.

A refrigerant having a low GWP and a low boiling point (for example, HFO1123) has thus been proposed (see, for example, Patent Literature 2).

It is known that HFO1123 has little influence on the ozone layer because its composition does not contain a chlorine atom, has little influence on global warming because it has a double bond and has a short atmospheric lifetime, and is excellent in performance (capacity) (low-boiling refrigerant). Further, HFO1123 belongs to a flammability classification corresponding to Rank 2L (mildly flammable) according to ASHRAE, and this provides safety.

As described above, HFO1123 ($CF_2$=CHF) is a high-performance refrigerant. On the other hand, it is known that a disproportional reaction (self-decomposition reaction) occurs therein under a specific condition. A disproportional reaction refers to a chemical reaction in which two or more molecules of the same kind react to each other to generate products of two or more different kinds.

The disproportional reaction of HFO1123 is the following chemical reaction:

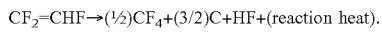

$CF_2$=CHF→(½)$CF_4$+(3/2)C+HF+(reaction heat).

This disproportional reaction is caused by the application of not less than a predetermined amount of energy to the refrigerant, and occurs in chains in a high-pressure environment.

CITATION LIST

Patent Literature

Patent Literature 1: Japanese Unexamined Patent Application Publication No. 2002-286334 (see, for example, FIG. 1)

Patent Literature 2: WO 2012/157764 (see, for example, [0009] and [0010])

SUMMARY OF INVENTION

Technical Problem

In the refrigeration apparatus described in Patent Literature 1, the solenoid valve opens when pump-down is performed, the compressor stops, and the pressure detected by the pressure sensor becomes higher than or equal to the predetermined value. At this time, however, subcooled liquid refrigerant on the upstream side of the solenoid valve rushes into the expansion valve. Hence, the liquid refrigerant strikes the expansion valve, and causes a water hammer action. Since the shock pressure due to the water hammer action becomes a high pressure of about ten and several megapascals in some cases, not less than a predetermined amount of energy is applied to the refrigerant.

When HFO1123 or a refrigerant mixture containing HFO1123 is adopted as the refrigerant for the refrigeration apparatus, a disproportional reaction is caused by not less than the fixed amount of energy, and consequently, a rapid pressure rise accompanied with a rapid temperature rise occurs. This involves the risk of, for example, explosion.

The present invention has been made to solve the above-described problem, and an object of the invention is to provide a refrigeration apparatus that improves safety while suppressing the influence on global warming.

Solution to Problem

A refrigeration apparatus according to the present invention includes a refrigerant circuit in which a compressor, a condenser, a liquid receiver, a first opening-and-closing valve, an expansion valve, and an evaporator are connected in order by pipes and through which refrigerant circulates. The refrigerant is HFO1123 or a refrigerant mixture containing HFO1123, and a ratio of a refrigeration capacity to an opening area of the opening-and-closing valve is within a range of 0.25 to 0.6 (kW/mm$^2$).

According to the refrigeration apparatus of the present invention, the influence on global warming can be suppressed because HFO1123 or the refrigerant mixture containing HFO1123 is adopted as the refrigerant. Further, a shock pressure due to a water hammer action at the expansion valve can be reduced, and the energy applied to the refrigerant can be limited to less than a fixed amount. Hence, it is possible to suppress the occurrence of a disproportional reaction and to improve safety.

DESCRIPTION OF EMBODIMENTS

Embodiments of the present invention will be described below with reference to the drawings. The present invention is not limited by Embodiments described below. In the following drawings, the size relationships among the components are sometimes different from actual ones.

Embodiment 1

Figure 1:
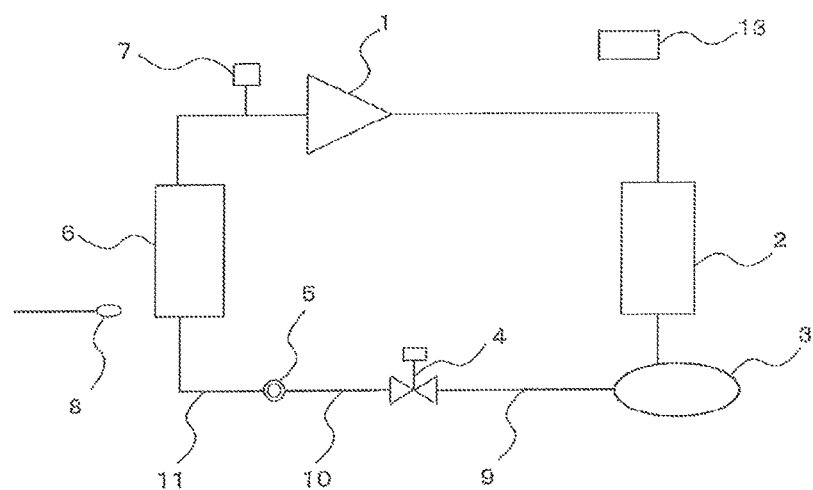
FIG. 1 is a refrigerant circuit diagram of a refrigeration apparatus according to Embodiment 1 of the present invention.
Figure 2:
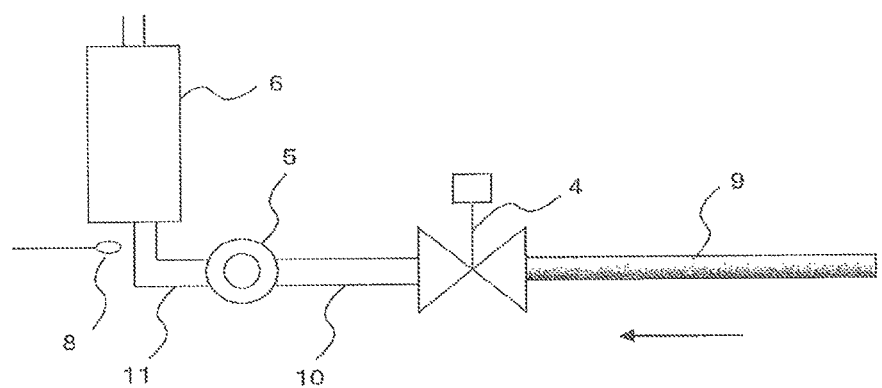
FIG. 2 shows an enlargement of the principal part of the refrigerant circuit diagram of the refrigeration apparatus according to Embodiment 1 of the present invention.

FIG. 1 is a refrigerant circuit diagram of a refrigeration apparatus according to Embodiment 1 of the present invention, and FIG. 2 shows an enlargement of the principal part of the refrigerant circuit diagram of the refrigeration apparatus according to Embodiment 1 of the present invention. Arrow in FIG. 2 shows the flowing direction of refrigerant, and this also applies to FIGS. 3 to 5 described later.

The refrigeration apparatus according to Embodiment 1 is used, for example, as a refrigerator, a freezer, a showcase, and a unit cooler, and includes a refrigerant circuit in which a compressor 1, a condenser 2, a liquid receiver 3, a solenoid valve 4, an expansion valve 5, and an evaporator 6 are connected in order by pipes. The refrigeration apparatus further includes a controller 13. A pressure sensor 7 is provided on a suction side (low-pressure side) of the compressor 1, and a temperature sensor 8 is provided in a cooling target space near the evaporator 6 (for example, the inside of the compartment of the refrigerator). A pipe that connects the liquid receiver 3 and the solenoid valve 4 is referred to as a first pipe 9; a pipe that connects the solenoid valve 4 and the expansion valve 5 is referred to as a second pipe 10, and a pipe that connects the expansion valve 5 and the evaporator 6 is referred to as a third pipe 11.

As refrigerant that circulates through the refrigerant circuit of the refrigeration apparatus according to Embodiment 1, HFO1123 or a refrigerant mixture containing HFO1123 is sealed. The refrigerant mixture is, for example, HFO1123+R32 or HFO1123+HFO1234yf. For example, when the ratio of R32 or HFO1234yf is high, the GWP (global warming potential) is high. Hence, the mixture ratio of the refrigerant mixture is preferably set such that the GWP is less than or equal to a predetermined value (for example, 300).

The compressor 1 sucks and compresses gas refrigerant into a high-temperature and high-pressure state, and discharges the gas refrigerant to the refrigerant circuit. For example, the compressor 1 is formed by an inverter compressor that is capable of capacity control.

The condenser 2 exchanges heat between air supplied from a blower such as a fan (not illustrated) and the refrigerant to condense the refrigerant.

The liquid receiver 3 is provided on the downstream side of the condenser 2, and stores the refrigerant.

The solenoid valve 4 is provided between the liquid receiver 3 and the expansion valve 5, and opens and closes the flow path of the refrigerant. While the solenoid valve 4 of Embodiment 1 is an electronic solenoid valve, it is not limited thereto. The solenoid valve 4 corresponds to "first opening-and-closing valve" of the present invention.

The expansion valve 5 expands the refrigerant by pressure reduction, and may be formed by an expansion valve whose opening degree can be variably controlled, for example, an electronic expansion valve.

The evaporator 6 exchanges heat between air supplied from a blower such as a fan (not illustrated) and the refrigerant to evaporate the refrigerant.

The pressure sensor 7 detects the pressure on the suction side (low-pressure side) of the compressor 1.

The temperature sensor 8 detects the temperature in the cooling target space (for example, the inside of the compartment of the refrigerator).

The controller 13 is formed by, for example, a microcomputer, and controls the entire refrigeration apparatus.

Next, the operation of the refrigeration apparatus of Embodiment 1 will be described.

When the temperature in the cooling target space detected by the temperature sensor 8 becomes less than a predetermined value (for example, 0 degrees C.), the solenoid valve 4 closes. At this time, since during the operation of the pump-down the compressor 1 continues operation, the refrigerant is collected in the liquid receiver 3. When the pressure detected by the pressure sensor 7 becomes less than a predetermined value, it is determined that the refrigerant is sufficiently collected in the liquid receiver 3, and the compressor 1 stops. Since return of the liquid refrigerant from the evaporator 6 is thereby suppressed at the next startup of the compressor 1, it is possible to reduce damage to the compressor 1 owing to liquid compression (because, when liquid compression occurs, the pressure in the cylinder of the compressor 1 rapidly rises).

When the compressor 1 is stopped, the first pipe 9 that connects the liquid receiver 3 and the solenoid valve 4 is filled with the liquid refrigerant. Particularly when the first pipe 9 is disposed, for example, inside a refrigerator or a showcase, it is filled with subcooled liquid refrigerant (having a density higher than that of the normal liquid refrigerant).

On the other hand, there is little liquid refrigerant inside the second pipe 10 that connects the solenoid valve 4 and the expansion valve 5 and inside the third pipe 11 that connects the expansion valve 5 and the evaporator 6 because the refrigerant is collected in the liquid receiver 3 by pump-down.

When the temperature in the cooling target space rises and the temperature in the cooling target space detected by the temperature sensor 8 becomes higher than or equal to the predetermined value (for example, 0 degrees C.), the solenoid valve 4 opens. Since the pressure on the low-pressure side also rises, when the pressure detected by the pressure sensor 7 becomes higher than or equal to the predetermined value, the compressor 1 starts. When the compressor 1 starts, the liquid refrigerant that fills the first pipe 9 hits the expansion valve 5 (hereinafter referred to as a water hammer action). Herein, a water hammer action (water hammering) refers to a phenomenon in which the pressure in the pipe is increased or decreased by a rapid change in flow velocity caused in the pipe when the compressor 1 stops or starts or when the valve (solenoid valve 4 in Embodiment 1) opens or closes.

Conventionally, a shock pressure of about 5 to 15 MPa was caused near the expansion valve 5 by this water hammer action at startup of the compressor 1. Since HFO1123 or the refrigerant mixture containing HFO1123 is used as the refrigerant in Embodiment 1, the pressure is increased by the water hammer action, and not less than a predetermined amount of energy is applied to the refrigerant. This may cause a disproportional reaction.

Accordingly, in Embodiment 1, the shock pressure due to the water hammer action is reduced by making the opening area of the solenoid valve 4 small. Embodiment 1 uses the solenoid valve 4 such that the opening area is about one rank smaller than that of a conventional solenoid valve used, for example, when the refrigerant is R22 or an HFC refrigerant (for example, R410A) and such that the ratio of the refrigeration capacity of the refrigeration apparatus to the opening area of the solenoid valve is within the range of 0.25 to 0.6 (kW/mm$^2$). This can reduce the shock pressure due to the water hammer action to about a half of the conventional one, and can reduce the energy applied to the refrigerant to less than the fixed amount. For this reason, the occurrence of a disproportional reaction can be suppressed and safety can be improved.

Further, the compressor 1 is an inverter compressor, and the controller 13 starts the compressor 1 at a frequency of about 10 to 20 MHz and operates the compressor 1 while gradually increasing the frequency. This can further reduce the shock pressure.

Embodiment 2

Figure 3:
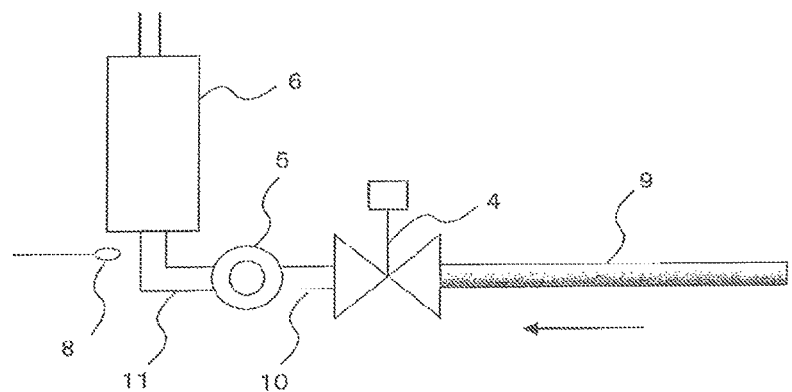
FIG. 3 shows an enlargement of the principal part of a refrigerant circuit diagram of a refrigeration apparatus according to Embodiment 2 of the present invention.

FIG. 3 shows an enlargement of the principal part of a refrigerant circuit diagram of a refrigeration apparatus according to Embodiment 2 of the present invention.

While Embodiment 2 will be described below, descriptions of components same as those of Embodiment 1 are omitted, and components identical or corresponding to those of Embodiment 1 are denoted by the same reference numerals.

In Embodiment 2, the length of a second pipe 10 that connects a solenoid valve 4 and an expansion valve 5 is set to be less (50 mm or less) than conventional ones. When the length of the second pipe 10 is 50 mm or less, the capacity of the second pipe 10 is less than or equal to about 30 cc.

Since the distance between the solenoid valve 4 and the expansion valve 5 is thereby shortened, the shock pressure due to a water hammer action can be reduced, and the energy applied to refrigerant can be reduced to less than a fixed amount. For this reason, the occurrence of a disproportional reaction can be suppressed, and safety can be improved.

Embodiment 3

Figure 4:
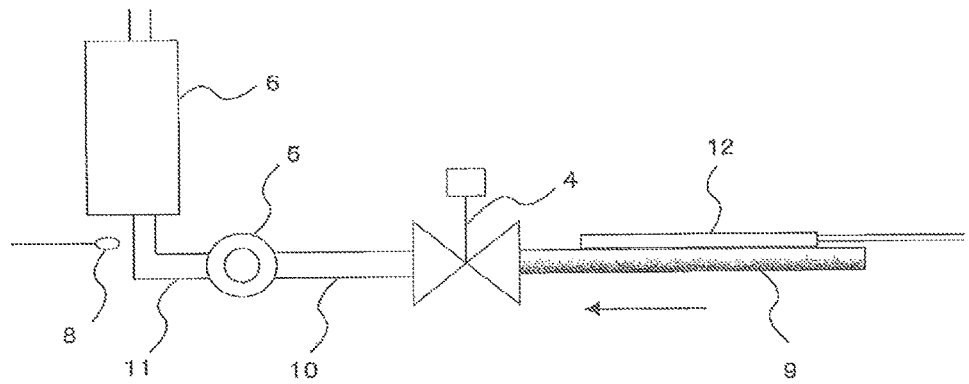
FIG. 4 shows an enlargement of the principal part of a refrigerant circuit diagram of a refrigeration apparatus according to Embodiment 3 of the present invention.

FIG. 4 shows an enlargement of the principal part of a refrigerant circuit diagram of a refrigeration apparatus according to Embodiment 3 of the present invention.

While Embodiment 3 will be described below, components overlapping with those of Embodiment 1 are omitted, and components identical or corresponding to those of Embodiment 1 are denoted by the same reference numerals.

In Embodiment 3, a first pipe 9 that connects a liquid receiver 3 and a solenoid valve 4 is provided with a heater 12. The heater 12 is formed by, for example, a heating wire, and is energized to heat the first pipe 9. The temperature of the heated first pipe 9 rises, and the temperature of liquid refrigerant that fills the first pipe 9 also rises. Since a part of the liquid refrigerant is gasified, the liquid refrigerant is easily compressed. This can reduce the shock pressure due to a water hammer action and can limit energy applied to the refrigerant to less than a fixed amount. For this reason, the occurrence of a disproportional reaction can be suppressed and safety can be improved.

Embodiment 4

Figure 5:
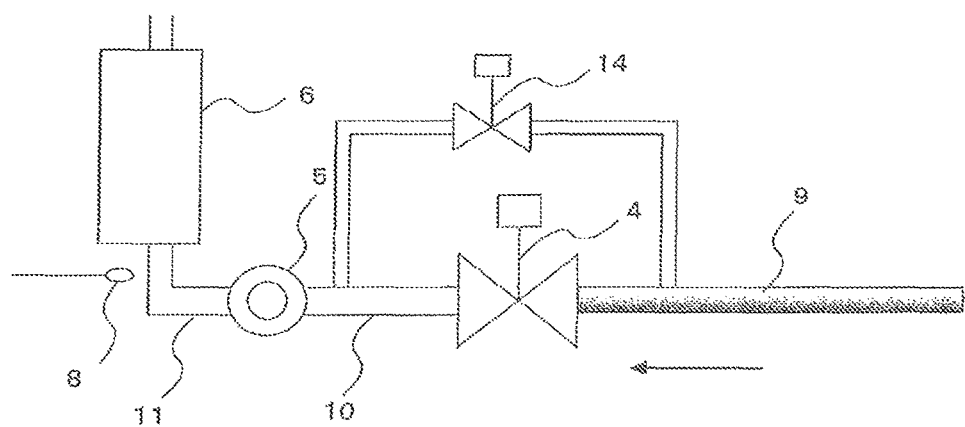
FIG. 5 shows an enlargement of the principal part of a refrigerant circuit diagram of a refrigeration apparatus according to Embodiment 4 of the present invention.

FIG. 5 shows an enlargement of the principal part of a refrigerant circuit diagram of a refrigeration apparatus according to Embodiment 4 of the present invention.

While Embodiment 4 will be described below, descriptions of components same as those of Embodiment 1 are omitted, and components identical or corresponding to those of Embodiment 1 are denoted by the same reference numerals.

In Embodiment 4, a branch pipe branches from: a first pipe 9 that connects a liquid receiver 3 and a solenoid valve 4; and a second pipe 10 that connects the solenoid valve 4 and an expansion valve 5. A second solenoid valve 14 is provided to the branch pipe. The opening area of the second solenoid valve 14 is less than that of the solenoid valve 4. While the second solenoid valve 14 of Embodiment 4 is an electronic solenoid valve, it is not limited thereto. The second solenoid valve 14 corresponds to "second opening-and-closing valve" of the present invention.

Regarding the operations of the solenoid valve 4 and the second solenoid valve 14, when the temperature in a cooling target space detected by a temperature sensor 8 becomes lower than a predetermined value (for example, 0 degrees C.), the solenoid valve 4 and the second solenoid valve 14 close. On the other hand, when the temperature in the cooling target space detected by the temperature sensor 8 becomes higher than or equal to the predetermined value (for example, 0 degrees C.), only the second solenoid valve 14 first opens, and the solenoid valve 4 opens a predetermined time later.

By first passing liquid refrigerant through the second solenoid valve 14 having a smaller opening area when the temperature in the cooling target space becomes higher than or equal to the predetermined value (for example, 0 degrees C.), as described above, the shock pressure due to a water hammer action can be reduced, and energy applied to the refrigerant can be limited to less than a fixed amount. For this reason, the occurrence of a disproportional reaction can be suppressed and safety can be improved.

REFERENCE SIGNS LIST

1: compressor, 2: condenser, 3: liquid receiver, 4: solenoid valve, 5: expansion valve, 6: evaporator, 7: pressure sensor, 8: temperature sensor, 9: first pipe, 10: second pipe, 11: third pipe, 12: heater, 13: controller, 14: second solenoid valve

The invention claimed is:
1. A refrigeration apparatus comprising:
a refrigerant circuit in which a compressor, a condenser, a liquid receiver, a first opening-and-closing valve, an expansion valve, and an evaporator are connected sequentially by refrigerant-circuit pipes and through which refrigerant circulates;
a branch pipe branching from
   a first pipe of the refrigerant-circuit pipes that connects the liquid receiver and the first opening-and-closing valve, and
   a second pipe of the refrigerant-circuit pipes that connects the first opening-and-closing valve and the expansion valve; and
a second opening-and-closing valve having an opening area less than the opening area of the first opening-and-closing valve, and being provided to the branch pipe; and
a controller configured to
   close the first opening-and-closing valve and the second opening-and-closing valve when a temperature in a cooling target space measured by a temperature sensor becomes lower than a predetermined value, and
   open the second opening-and-closing valve first, and open the first opening-and-closing valve a predetermined time after the opening of the second opening-and-closing valve when the temperature in the cooling target space becomes higher than or equal to the predetermined value, wherein
the refrigerant being HFO1123 or a refrigerant mixture containing HFO1123,
the first opening-and-closing valve being configured to have an opening area such that a ratio of a refrigeration capacity of the refrigeration apparatus to the opening area is within a range of 0.25 to 0.6 (kW/mm$^2$).

2. The refrigeration apparatus of claim 1, wherein the second pipe of the refrigerant-circuit pipes that connects the first opening-and-closing valve and the expansion valve has a non-zero length of 50 mm or less.

3. The refrigeration apparatus of claim 1, wherein the first pipe of the refrigerant-circuit pipes that connects the liquid receiver and the first opening-and-closing valve is provided with a heater.

4. The refrigeration apparatus of claim 1, wherein
the compressor is an inverter compressor, and
the controller is configured to start the inverter compressor at a frequency of 10 to 20 Hz and operate the inverter compressor while gradually increasing the frequency.

* * * * *